(12) United States Patent
Ma

(10) Patent No.: US 6,973,078 B2
(45) Date of Patent: Dec. 6, 2005

(54) METHOD AND APPARATUS FOR IMPLEMENTING LOW LATENCY CROSSBAR SWITCHES WITH INTEGRATED STORAGE SIGNALS

(75) Inventor: James H. Ma, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 940 days.

(21) Appl. No.: 09/839,897

(22) Filed: Apr. 20, 2001

(65) Prior Publication Data

US 2002/0154625 A1  Oct. 24, 2002

(51) Int. Cl.[7] .................. H04L 12/28; H04L 12/66
(52) U.S. Cl. .................. 370/359; 710/305; 710/317
(58) Field of Search .............. 370/351, 352, 370/395, 374, 357, 362, 363, 368, 371, 360, 370/386, 389, 422, 423, 359; 365/189, 191, 365/194, 230, 233; 710/305, 306, 316, 317, 710/100, 311

(56) References Cited

U.S. PATENT DOCUMENTS

| | | | |
|---|---|---|---|
| 4,807,183 A | | 2/1989 | Kung et al. |
| 4,985,830 A | | 1/1991 | Atac et al. |
| 5,130,979 A | * | 7/1992 | Ohtawa ................ 370/374 |
| 5,189,665 A | | 2/1993 | Niehaus et al. |
| 5,261,059 A | | 11/1993 | Hedberg et al. |
| 5,878,039 A | * | 3/1999 | Gorshe et al. ........... 370/376 |
| 6,215,726 B1 | * | 4/2001 | Kubo ................... 365/233 |
| 6,577,625 B1 | * | 6/2003 | Chiou et al. ............. 370/381 |
| 6,711,170 B1 | * | 3/2004 | Brown ................. 370/395.7 |

* cited by examiner

*Primary Examiner*—Ajit Patel
(74) *Attorney, Agent, or Firm*—Park, Vaughan & Fleming LLP

(57) ABSTRACT

A digital crossbar switch utilizes an asynchronous RAM to provide high density and low latency storage and a write enable pulse generator to generate write enable pulses that are independent of the clock signal duty cycles. The crossbar switch includes a plurality of ports coupled to a bus, at least one memory element coupled to one of the plurality of ports, and a circuit for generating a write enable pulse coupled to each of the memory element. The circuit for generating the write enable pulse includes a pulse generator for generating a pulse, the pulse tracking a leading edge of a clock signal, a write enable signal generator for generating a write enable signal, and a first logic circuit coupled to the pulse generator and the write enable signal generator for generating the write enable pulse by combining the pulse and the write enable signal.

29 Claims, 4 Drawing Sheets

METHOD AND APPARATUS FOR IMPLEMENTING LOW LATENCY CROSSBAR SWITCHES WITH INTEGRATED STORAGE SIGNALS

FIELD OF THE INVENTION

This invention relates to the implementation of crossbar switches for receiving data from multiple sources and transmitting data to multiple destinations, in particular, to a write enable circuit that allows the use of asynchronous random access memory (RAM) to provide low latency and high density temporary storage for crossbar switches.

All SPARC trademarks are used under license and are trademarks of SPARC International, Inc. in the United States and other countries. Products bearing SPARC trademarks are based upon an architecture developed by Sun Microsystems, Inc.

BACKGROUND OF THE INVENTION

Most computer-based systems use a shared bus scheme, either Peripheral Component Interconnect (PCI), Industry Standard Architecture (ISA), or VersaModule Eurocard (VME). One limitation of the shared bus is that multiple processors in a shared bus system must share a bus and wait for access to send data to or receive data from another processor on the bus. As a result, communication rate between any two processing units on the bus decreases in direct proportion to the number of the processing units on the bus. For systems having large communication requirements, the throughput limitation of the communication media can severely curtail system performance.

Bus switches, e.g., digital crossbar switches, are capable of accommodating independent simultaneous communications between processors in a multiprocessor system, thereby increasing communication throughput. In contrast to a shared bus, crossbar switches allow a processor to transfer data with another processor concurrently with and independently from other processors in the system.

Crossbar switches often contain storage locations so that the transmitted data may be held temporarily until the destination processor is ready to receive the data. The use of temporary storage reduces the need for the destination processor to be available when the source processor is ready to transmit data. To optimize the performance of the system, storage operation should be as fast as possible and introduce as little latency as possible.

Digital storage may be implemented with bistable elements such as flip-flops or memory elements such as random access memory elements (RAMs). Flip-flops are typically very fast but hold only one bit of data each (e.g., low storage density). Flip-flops are also relatively large in physical size and thus may be incompatible with current needs for smaller devices. RAMs, on the other hand, are more compact in size and can hold large amounts of data in comparison to the flip-flops. However, RAMs may have complex control timing requirements and may include additional latency in data transfer.

One difficulty in achieving timing requirements relates to write enable pulse generation. Write enable pulses are generated to establish a window for the write cycle to occur and should have a pulse width that ensures a predetermined setup time and hold time for the write enable signal, address signals, and input write data signal. If the write enable pulse is not precisely controlled during the write cycle, incorrect data may be written into the selected memory cell or no data may be written into the destination cell.

Typically, write enable pulses are dependent on the frequency and the duty cycle of the system clock signal, e.g., the leading edge of the system clock signal initiates the write enable pulse while the duty cycle of the system clock signal determines the duration of the write enable pulse. System clock signals are often generated by phase lock loop (PLL) circuits which often do not have tight control of the trailing edges of the clock signals. Thus, if the duration of the write enable pulse is dependent on the duty cycle (or the trailing edge) of the system clock signal, the duration of the write enable pulse may be difficult to control.

SUMMARY OF THE INVENTION

In accordance with the present invention, a digital crossbar switch utilizes an asynchronous RAM to provide high density and low latency storage and a write enable pulse generator to generate write enable pulses that are independent of the clock signal duty cycle.

In one embodiment, a crossbar switch includes a plurality of ports coupled to a bus, at least one memory element coupled to one of the plurality of ports, and a circuit for generating a write enable pulse coupled to each of the memory elements. The circuit for generating the write enable pulse includes a pulse generator for generating a pulse, the pulse tracking a leading edge of a clock signal. The circuit also includes a write enable signal generator for generating a write enable signal and a first logic circuit coupled to the pulse generator and the write enable signal generator for generating the write enable pulse by combining the pulse and the write enable signal.

In one embodiment, the pulse generator includes a device for generating an output signal in response to the clock signal, a first delay circuit for generating a first delay signal in response to the output signal, a second delay circuit coupled to the first delay circuit, the second delay circuit generating a second delay signal in response to the first delay signal, and a second logic circuit coupled to the first delay circuit and the second delay circuit. The second logic circuit generates the write enable pulse by combining the first delay signal and the second delay signal.

This summary is not intended to limit the scope of the invention, which is defined solely by the claims attached hereto.

While specific embodiments are described and illustrated herein, these embodiments are not intended to limit the scope of the invention, which is susceptible to various modifications and alternative forms.

DETAILED DESCRIPTION OF THE INVENTION

In accordance with one embodiment of the present invention, a digital crossbar switch utilizes an asynchronous RAM to provide a high density and low latency storage and a write enable pulse generator to generate write enable pulses that are independent of the clock signal duty cycle.

Figure 1:
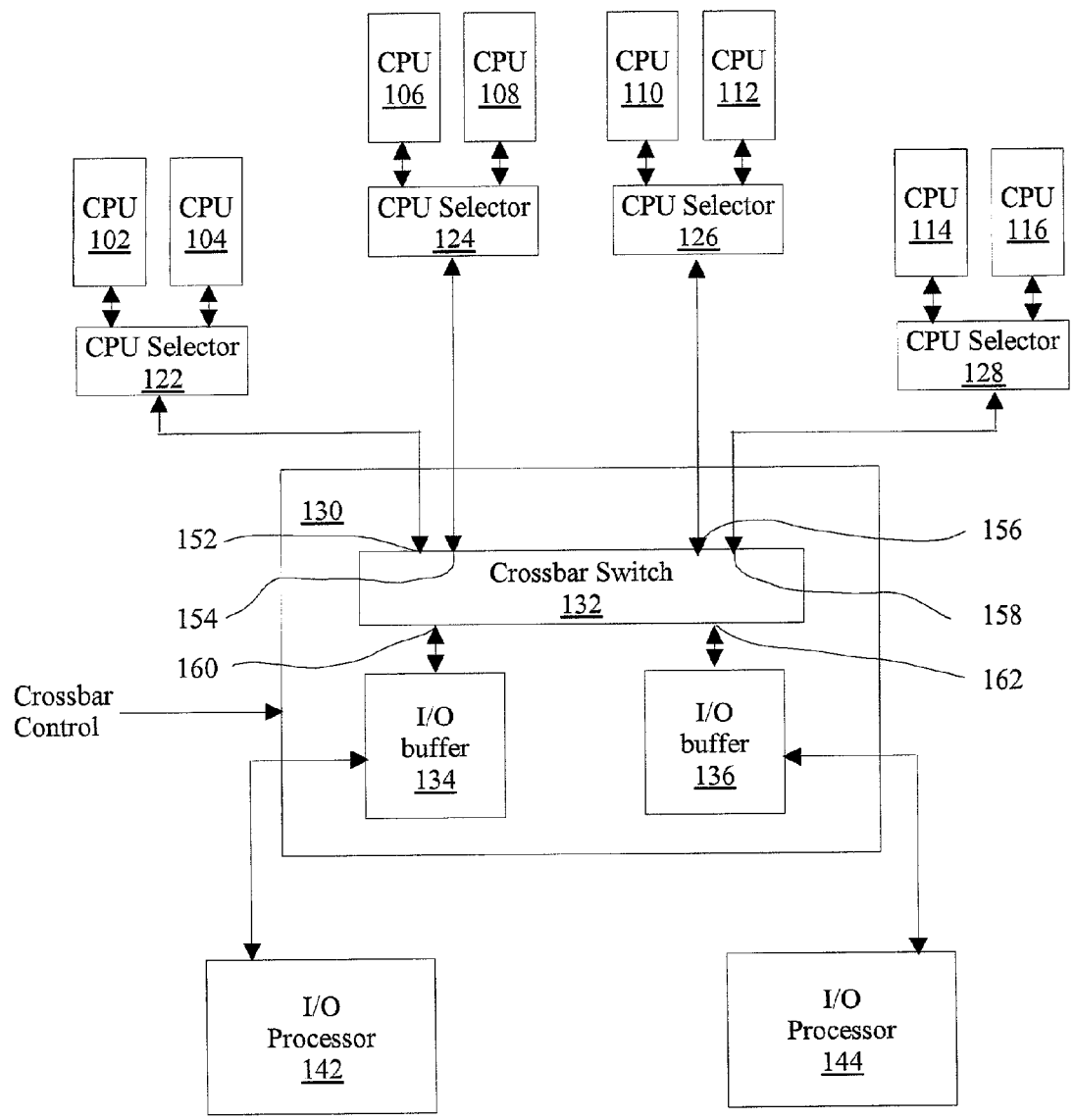
FIG. 1 shows a multi-processor system having a plurality of processors coupled to a bus switch.

FIG. 1 shows a multi-processor system 100 having a plurality of processors coupled to a bus switch 130. Multi-processor system 100 may be a general 8-way, UltraSPARC™-III based work group server manufactured by Sun Microsystems, Inc., but may be other suitable multi-processor systems. In one embodiment, multi-processor system 100 includes eight central processing units (CPUs) 102, 104, 106, 108, 110, 112, 114 and 116 and two input-output processors (I/O processors) 142 and 144, all coupled to bus switch 130. The plurality of processing units 102, 104, 106, 108, 110, 112, 114, 116, 142 and 144 communicate with each other through a crossbar switch 132 in bus switch 130. Crossbar switch 132 includes, e.g., six ports 152, 154, 156, 158, 160, and 162. In one embodiment, a pair of CPUs (e.g., CPUs 102 and 104, CPUs 106 and 108, CPUs 110 and 112, and CPUs 114 and 116) share one port (e.g., port 152, 154, 156 and 158, respectively) via a CPU selector (e.g., CPU selector 122, 124, 126 and 128, respectively).

CPU selectors 122, 124, 126 and 128 select which CPU will send data to or receive data from its respective crossbar switch port 152, 154, 156, or 158. CPU selectors 122, 124, 126, and 128 may be any type of multiplexers, e.g., a hardware multiplexer or a logical multiplexer. In one embodiment, CPU selectors 122, 124, 126, and 128 may be any suitable data switches such as a data switch between the CPU, main memory, and the system bus in a general 8-way, UltraSPARC™-III based work group server mentioned above.

In one embodiment, each I/O processor 142 and 144 is coupled to its respective port 160 and 162 via a respective I/O buffer 134 and 136. I/O processors 142 and 144 may be, but are not limited to, displays, ethernet, hard disks, PCI bus devices, and networking devices. I/O buffers 134 and 136 provide additional storage and may be optional. In general, I/O buffers 134 and 136 may be any suitable storage elements such as, but are not limited to, RAMs.

Although crossbar switch 132 is shown with six ports, there is generally no limitations as to the number of ports. In general, the number of ports for a crossbar switch often depends on the implementation as well as the cost. For example, more ports require more pins which in turn drive up the cost of the device. Similarly, more ports result in a bigger package which may not be adequate for a specific implementation.

Each port 152, 154, 156, 158, 160 and 162 may accommodate a different number of processing units by using one or multiple CPU selectors. In the alternative, ports 152, 154, 156, 158, 160 and 162 may be coupled directly to their respective processing units. Ports 152, 154, 156, 158, 160 and 162 may also accommodate any combination of processing units. For example, a port may be coupled to a selector which is in turn coupled to a CPU and an I/O processor. From a crossbar switch's point of view, data is being exchanged regardless of the type of processing units. However, from a system usage stand point, the same type of processing units are typically grouped together, for example, I/O processors are typically coupled to devices such as peripherals that are different from a CPU. Thus, I/O processors are typically separated from the CPUs.

Although each port may accommodate multiple processing units via selectors, the number of processing units per port may affect the performance of the system because the processing units must take turns executing their processes through the shared port. In other words, selecting one processing unit from multiple processing units through a selector is similar to a shared bus structure because the processing units must wait for one resource to become available. Whether to use a dedicated port for a processing unit involves balancing of the performance desired and the cost involved because although one processing unit per port may optimize system performance, the cost may be prohibitively high.

Figure 2:
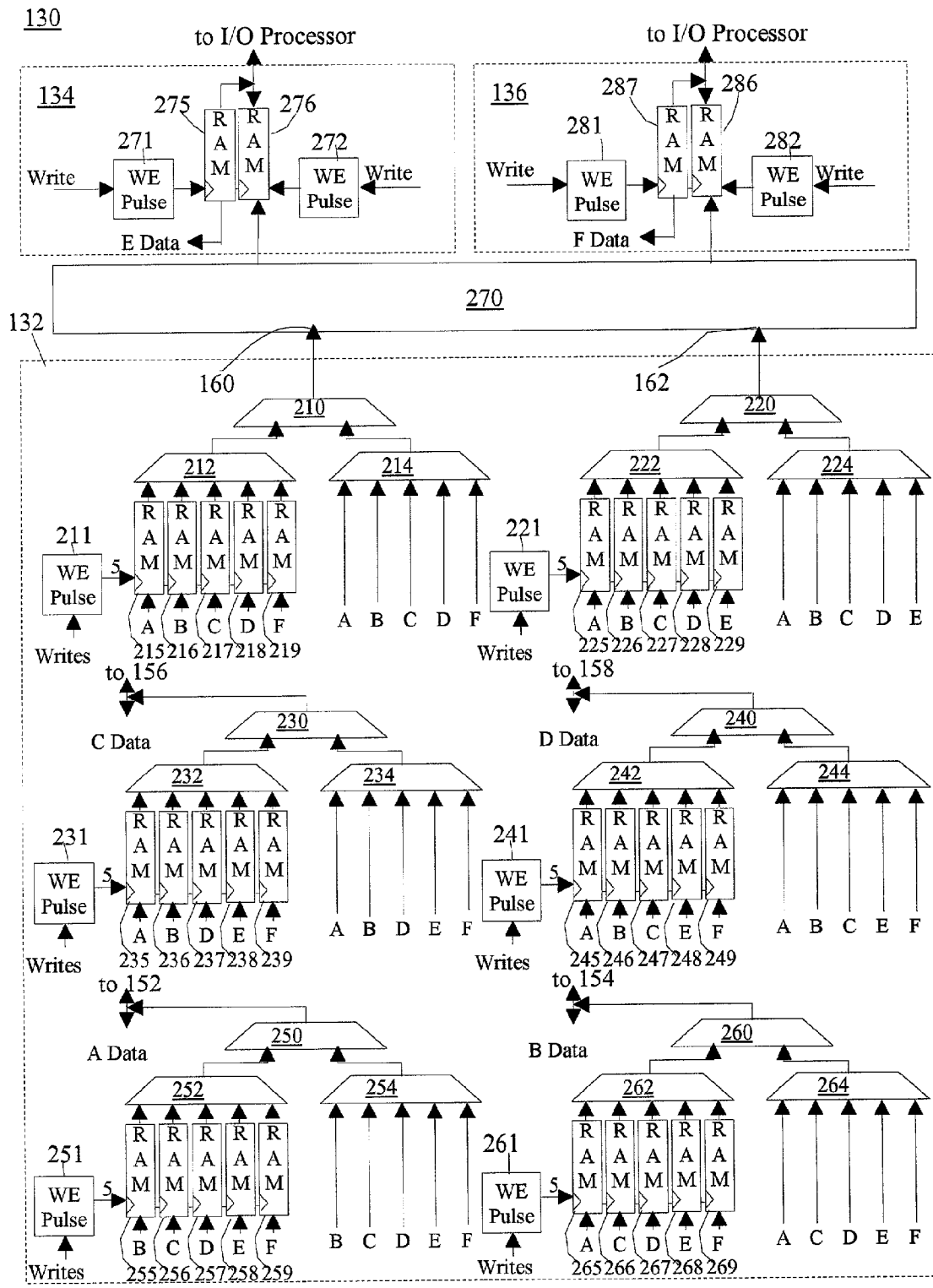
FIG. 2 shows a schematic of a detailed bus switch.

FIG. 2 shows the bus switch 130 in FIG. 1 in detail. Crossbar switch 132 may be any suitable switch for address broadcasting and data switching. For example, crossbar switch may be an MDR8 switch manufactured by Sun Microsystems, Inc., Palo Alto, Calif. Crossbar switch 132 may be symmetrical, meaning that all ports are identical. In the alternative, the ports may be configured to tailor to each port's specific requirements. For example, storage space for each port may differ in size. Crossbar switches having ports with different configurations are called asymmetrical crossbar switches.

Each port of a crossbar switch may contain storage space to store data transmitted from other ports of the crossbar switch so the transmitted data may be held temporarily until the destination processing unit is ready to receive data. By providing temporary storage, the need for the destination processing unit to be free when the source processing unit is ready to transmit is reduced, thereby improving system performance. To further optimize the system performance, storage space may be organized as a first-in-first out (FIFO) unit so that the order of transfers can be automatically maintained. Automatically maintaining the order of the transfer reduces latency as well as increasing processing speed.

FIFOs may be implemented in various ways, e.g., using flip-flops, synchronous RAMs, asynchronous RAMs or any other suitable memory elements. Flip-flops have low storage density and are large in size but provide speed and are relatively inexpensive. Synchronous RAMs are compact in size but incur additional latency in synchronizing the signals. Asynchronous RAMs are compact in size and provide better performance than synchronous RAMs. However, asynchronous RAMs require precise control of the write enable pulse so that the setup and hold time requirements with respect to the address and input data signals are met over all process, voltage, and temperature variations. The size of the storage space depends on the specific requirements for its respective port.

The storage space for a port may be arranged such that there is a memory element per port. For example, for a symmetrical crossbar switch 132 where each port may receive data from all other ports on crossbar switch 132, the number of memory elements may be equal to the number of ports minus one, e.g., five. Referring to FIG. 2, crossbar switch port 152 includes five RAMs 255, 256, 257, 258 and 259 for storing data from ports 154, 156, 158, 160 and 162, respectively. Similarly, port 154 includes RAMs 265, 266, 267, 268 and 269 for storing data from ports 152, 156, 158, 160, and 162, respectively; port 156 includes RAMs 235, 236, 237, 238 and 239 for storing data from ports 152, 154, 158, 160 and 162, respectively; port 158 includes RAMs 245, 246, 247, 248 and 249 for storing data from ports 152, 154, 156, 160 and 162, respectively; port 160 includes RAMs 215, 216, 217, 218 and 219 for storing data from ports 152, 154, 156, 158 and 162, respectively; and port 162 includes RAMs 225, 226, 227, 228 and 229 for storing data from ports 152, 154, 156, 158, and 160, respectively. Typically, each RAM is sized for the maximum or worst case for that particular connection.

In one embodiment, a shared memory is used instead of a dedicated memory element for each port. It is noted that although each RAM is typically sized for the maximum worst case for a particular connection, it is unlikely that all RAMs will be operating at a worst case scenario during actual operation. In one embodiment, the shared memory may be used to implement multiple virtual memories. For example, for a symmetrical crossbar switch 132 where each port may receive data from all other ports on crossbar switch 132, the number of virtual memory elements is equal to the number of ports minus one, e.g., five. The virtual memory elements may be dynamically sized according to their current usage. A shared memory allows reduction in the total size of the memory and allows greater adjustment and efficiency of the memory available. In one embodiment, the shared memory described in U.S. application Ser. No. 09/597,128 entitled "Method and Apparatus For Efficient Implementation of Multiple Virtual FIFOs", filed Jun. 20, 2000, and assigned to the same assignee as the present invention may be used. U.S. application Ser. No. 09/597,128 is hereby incorporated by reference in its entirety.

In one embodiment, each port of the crossbar switch may transmit data to one or more of the other ports and all ports may operate concurrently. Controls of the crossbar switch may come from, for example, a control circuit which controls inputs from all the processing units coupled to the crossbar switch. In general, all of the processing units inform the control circuit of actions required. The control circuit converts the actions required into actual control bits or signals for the ports. For example, CPU 102 (FIG. 1) coupled to port 152 may inform a control circuit (not shown) that it wants to receive information from CPU 106 coupled to port 154. The control circuit transforms this request into a control signal and transmits the control signal to port 154 informing port 154 that port 152 needs certain information from port 154. In one embodiment, the control circuit may be a control switch in a general 8-way, UltraSPARC™-III based work group server manufactured by Sun Microsystems, Inc. In general, any suitable control circuit may be used.

In one embodiment, each crossbar switch port 152, 154, 156, 158, 160 and 162 is coupled to three multiplexers for selecting data to be read. For example, port 152 is coupled to a bypass multiplexer 250, a direct data multiplexer 254 and a delayed data multiplexer 252; crossbar switch port 154 is coupled to a bypass multiplexer 260, a direct data multiplexer 264 and a delayed data multiplexer 262; crossbar switch port 156 is coupled to a bypass multiplexer 230, a direct data multiplexer 234 and a delayed data multiplexer 232; crossbar switch port 158 is coupled to a bypass multiplexer 240, a direct data multiplexer 244 and a delayed data multiplexer 242; crossbar switch port 160 is coupled to a bypass multiplexer 210, a direct data multiplexer 214 and a delayed data multiplexer 212; and crossbar switch port 162 is coupled to a bypass multiplexer 220, a direct data multiplexer 224 and a delayed data multiplexer 222.

Direct data multiplexers 214, 224, 234, 244, 254 and 264 receive data directly from the other ports of crossbar switch 132. For example, multiplexer 214 receives data A from port 152, data B from port 154, data C from port 156, data D from port 158, and data F from port 162 with no intervening delays. In other words, crossbar switch port 160 can communicate with crossbar switch ports 152, 154, 156, 158 and 162 directly.

Delayed data multiplexers 212, 222, 232, 242, 252 and 262 read data from other ports that were previously stored in their respective memory space. For example, for a six-port crossbar switch, each delayed data multiplexer has five inputs which are connected to five RAMs. In the embodiment shown, delayed data multiplexers 212 read data from RAM 215 which stores data A from port 152, RAM 216 which stores data B from port 154, RAM 217 which stores data C from port 156, RAM 218 which stores data D from port 158, and RAM 219 which stores data F from port 162.

Bypass multiplexers 210, 220, 230, 240, 250 and 260 select between their respective direct data multiplexers 214, 224, 234, 244, 254, 264 and bypass multiplexers 212, 222, 232, 242, 252, 262. Therefore, depending on the communication a particular port desires, its bypass multiplexer chooses which mode of communication to use. In general, the processor coupled to the port decides whether it wants to receive data directly or whether it wants data which have been stored in the RAMs. For example, if port 160 desires to communicate with port 156 right away, direct data multiplexer 214 is used. On the other hand, if the communication can take time, delayed data multiplexer 212 is used. I/O processor 142 coupled to port 160 decides whether it wants to receive data directly from another port or whether it wants data which have been stored in a memory space. I/O processor 142 also determines whether crossbar switch port 160 can accept the requested data. In one embodiment, if crossbar switch port 160 is busy, e.g., reading data from another port or internally executing other codes, the request is queued in an internal queue until port 160 is available. Therefore, if port 160 cannot accept data from the requested port 156 right away, port 160 may store the requested data C from port 156 in RAM 217 until the next available cycle during which port 160 may read the requested data from RAM 217 through the delayed data multiplexer 212. In general, any suitable request queuing process may be used.

A person of ordinary skill in the art will appreciate that the crossbar switch may be configured to only receive data directly, thereby eliminating the need for delayed data multiplexers and bypass multiplexers. In the alternative, the crossbar switch may be configured to only receive data via the buffers, thereby eliminating the need for direct data multiplexers and bypass multiplexers.

The sizes of the direct data, delayed data and bypass multiplexers for a particular port depend on the number of ports it wishes to communicate with. For example, the direct data multiplexers and the delayed data multiplexers in FIG. 2 each has five inputs because crossbar switch 132 has six ports and is a symmetrical crossbar switch. Therefore, each port needs to receive data from the other five ports. The multiplexers may be implemented by using logical multiplexers which can be of any arbitrary size. Typically, the vendor library dictates the size of the multiplexers and the multiplexers typically need to be layered to achieve the number of inputs required. It is noted that larger multiplexers tend to be slower, but there is no limit to the size of an individual multiplexer.

Crossbar switches generally use advanced packet-switching technology to route data directly from one processor (e.g., the CPU) to another processor (e.g., the graphics system). Non-blocking crossbar switches allow multiple streams of data to flow independently from one processor to another. The multiple streams do not interfere with or block each other and as long as the source and destination processors are free, data transfer can occur. Blocking crossbar switches, on the other hand, do not allow simultaneous reads and writes to the same port of the crossbar switch. The choice between a non-blocking and blocking crossbar switch is often dictated by performance desired and cost.

In one embodiment of the present invention, simultaneous reads and writes to the RAMs are allowed. In such RAMs, the RAM includes a write port and at least one read port. However, other RAMs such as RAMs with one port that can do either a write operation or a read operation at any one time may also be used. It is noted, however, that RAMs with only one port may cause possible latency when both the source device and the destination device want to access data at the same time because the requests cannot be processed concurrently. Thus, performance of the RAM may be affected.

A write enable (WE) pulse generator is coupled to and generates write enable pulses for its respective RAM. For example, WE pulse generators 211 provide write enable pulses for RAMs 215 through 219, each RAM 215 through 219 having its own WE pulse generator. Similarly, WE pulse generators 221 generate write enable pulses for RAMs 225 through 229; WE pulse generators 231 generate write enable pulses for RAMs 235 through 239; WE pulse generators 241 generate write enable pulses for RAMs 245 through 249; WE pulse generators 251 generate write enable pulses for RAMs 255 through 259; and WE pulse generators 261 generate write enable pulses for RAMs 265 through 269. WE pulse generators 211, 221, 231, 241, 251, and 261 generate write enable pulses from their respective write command Writes which is generated from other control means in the system. WE pulse generators are discussed in detail below.

Ports 160 and 162 are coupled to a bus 270. In one embodiment, where I/O processors are coupled to their respective ports through I/O buffers, e.g., I/O buffers 134 and 136, the I/O buffers are coupled to bus 270 directly. In one embodiment, I/O buffers 134 and 136 include RAMs 275 and 276, and 281 and 286, respectively. The RAMs may be either synchronous or asynchronous. I/O buffers 134 and 136 temporarily store data for data transfers between I/O processors 142 and 144 (FIG. 1). In general, I/O buffers may be implemented in any suitable manner.

RAMs 275, 276, 285 and 286 are coupled to WE pulse generators 271, 272, 281 and 282, respectively, for controlling the write enable pulses. In one embodiment, WE pulse generators 271, 272, 281 and 282 are similar to WE pulse generators 211, 221, 231, 241, 251 and 261 described above. In one embodiment, the write commands Writes are generated by the respective I/O processors (e.g., I/O processors 142 and 144 in FIG. 1).

In one embodiment, WE pulse generators described in a co-pending U.S. application Ser. No. 09/839,441 entitled "Method and Apparatus for Generating and Controlling Memory Write Signals" filed January xx, 2000 and is assigned to the same assignee as the present invention are used to generate the write enable pulses. Patent application Ser. No. 09/839,441 is hereby incorporated by reference in its entirety.

Figure 3:
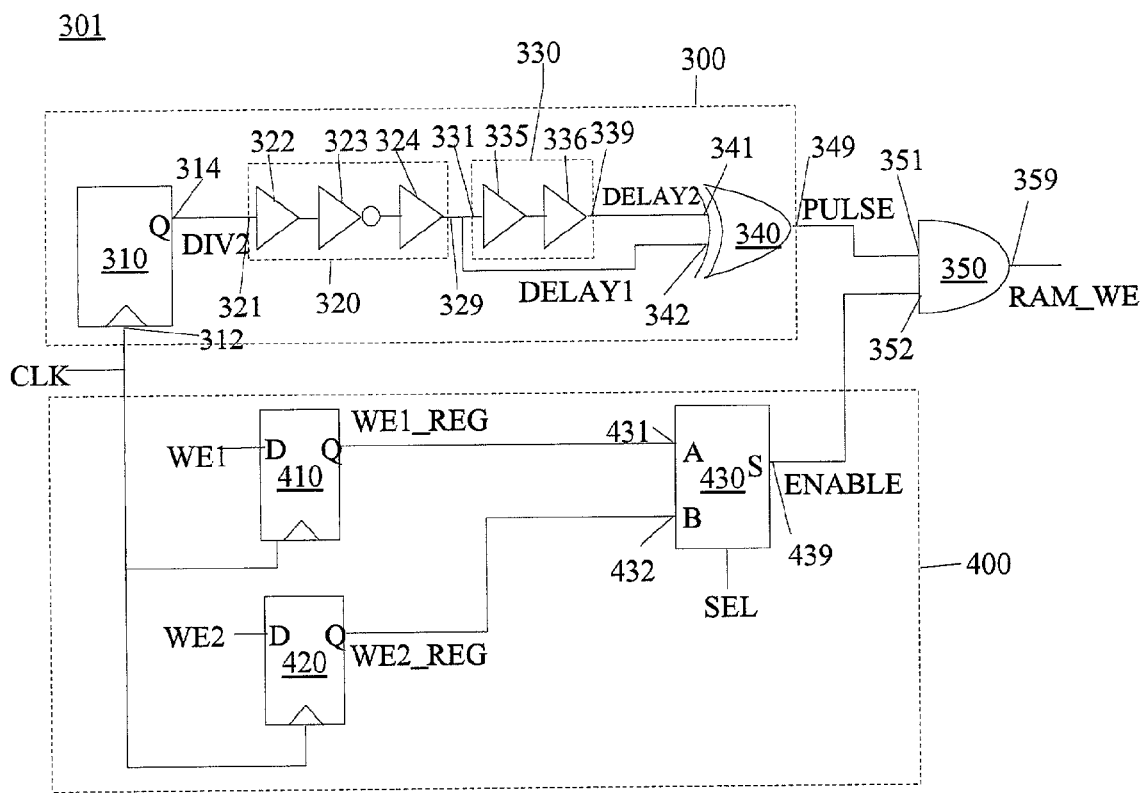
FIG. 3 shows a circuit for generating write enable pulses.

FIG. 3 illustrates a circuit for generating and controlling a write enable pulse. The write pulse generator includes a pulse generator 300 for generating a pulse signal PULSE in response to a clock signal CLK, a write enable signal generator 400 for generating a write enable signal ENABLE from a plurality of external write enable signals (e.g., external write enable signals WE1 and WE2), and a logic circuit 350 coupled to pulse generator 300 and write enable signal generator 400 for generating a RAM write enable pulse RAM_WE by combining pulse signal PULSE and write enable signal ENABLE. It is noted that pulse signal PULSE and write enable signal ENABLE are generated independently from each other. Logic circuit 350 combines the pulse signal PULSE and the write enable signal ENABLE at the final stage of the write enable pulse generator, thereby allowing maximum flexibility and tight control of the RAM write enable pulse RAM_WE. Logic circuit 350 may be an AND gate or a NAND gate depending on whether RAM write enable pulse RAM_WE is active high or active low.

Pulse generator 300 includes, for example, an edge-triggered toggle flip-flop (T flip-flop) 310. T flip-flop 310 receives a clock signal CLK at an input terminal 312 and generates an output signal DIV2 at an output terminal 314 in response to the clock signal CLK. T flip-flop 310 responds to the leading edge of the clock signal CLK, thereby producing an output signal DIV2 that is decoupled from the trailing edge of the clock signal CLK.

Output terminal 314 of T flip-flop 310 is coupled to an input terminal 321 of a delay circuit 320. Delay circuit 320 generates a delay signal DELAY1 which determines the leading edge of the RAM write enable signal RAM_WE, in response to output signal DIV2 at an output terminal 329. Delay circuit 320 may include any combination of inverting and/or noninverting elements that are capable of producing the predetermined setup delay for the address and data signals with respect to the desired RAM write enable pulse RAM_WE. For example, delay circuit 320 may include noninverting delay elements 322 and 324 and inverting delay element 323 coupled in series.

Output terminal 329 of delay circuit 320 is coupled to an input terminal 331 of a delay circuit 330. Delay circuit 330 generates a delay signal DELAY2 in response to delay signal DELAY1 at an output terminal 339. Delay signal DELAY2 determines the trailing edge of the RAM write enable pulse RAM_WE, as well as the hold time of the address and data signals with respect to the RAM write enable pulse RAM_WE. Delay circuit 330 may include a combination of inverting and/or noninverting delay elements necessary to generate a specified pulse and hold delays. For example, delay circuit 330 may include two noninverting delay elements 335 and 336 coupled in series.

Delay circuits 320 and 330 provide a way to independently adjust the leading and trailing edges of the RAM write enable pulse RAM_WE. Delay circuits 320 and 330 are coupled to input terminals 341 and 342, respectively, of a logic circuit 340 which generates a pulse signal PULSE at an output terminal 349 by combining delay signals DELAY1 and DELAY2. The type of logic circuit 340 is dependent on the polarities of delay signal DELAY1 and delay signal DELAY2. For example, logic circuit 340 may be an XOR logic gate if delay signal DELAY2 is not inverted from delay signal DELAY1. In the alternative, logic circuit 340 may be an XNOR logic gate if delay signal DELAY2 is inverted from delay signal DELAY1. t is noted that delay circuits 320 and 330 are not polarity sensitive because the type of logic circuit 340 is adjusted in accordance with the polarities of delay circuits 320 and 330.

Write enable signal generator 400 includes a D flip-flop 410 which registers an external write enable signal WE1 and a D flip-flop 420 which registers an external write enable signal WE2. External write enable signals WE1 and WE2 may be generated by any suitable functional logic. D flip-flops 410 and 420 may be clocked by the same clock signal CLK that clocks the toggle flip-flop 310.

D flip-flop 410 and D flip-flop 420 are coupled to input terminals 431 and 432, respectively, of a selector 430 which selects a registered external write enable signal (e.g., registered external write enable signal WE1_REG or WE2_REG) and generates a write enable signal ENABLE at an output terminal 439. Selector 430 may be a multiplexer and makes its selection based on a select signal SEL. Select signal SEL may be generated by the control circuit described above. A person of ordinary skill in the art will appreciate that the number of inputs for selector 430 may be adjusted to select from more than two external write enable signals.

Output terminal 349 of logic circuit 320 and output terminal 439 of selector 430 are coupled to input terminals 351 and 352, respectively, of logic circuit 350. Logic circuit 350 generates the RAM write enable signal RAM_WE at an output terminal 359.

Figure 4:
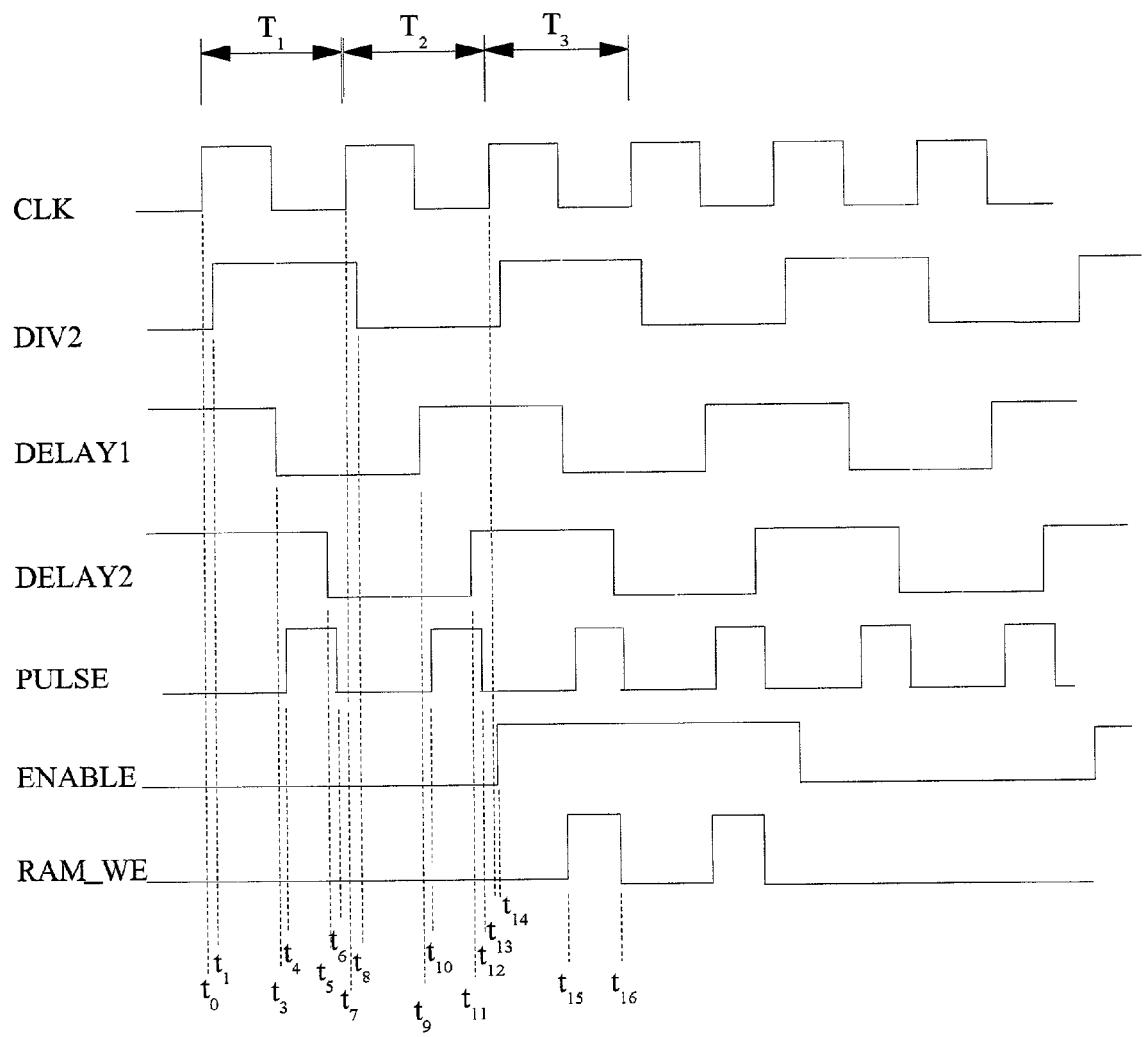
FIG. 4 shows a timing diagram of the circuit shown in FIG. 3.

FIG. 4 illustrates a timing diagram for circuit 301 of FIG. 3. Timing diagram depicted in FIG. 4 is not drawn to scale and does not represent relative voltage levels of the various signals. The various elements in circuit 301 are clocked by an input clock signal CLK. At the rising edge of the first clock pulse $T_1$ (i.e., at time $t_0$), output signal DIV2 is triggered to go to a logic high state after a time delay, at time $t_1$. The time delay is the time delay of T flip-flop 310. At the rising edge of the next clock pulse $T_2$ (i.e., at time $t_7$), output signal DIV2 goes to a logic low state after a time delay, at time $t_8$. In this embodiment, output signal DIV2 is at approximately one-half frequency of the input clock signal CLK which has a duty cycle of approximately 50%.

Output signal DIV2 propagates through delay circuit 320 and produces a delay signal DELAY1 which lags behind output signal DIV2 by a time delay produced by delay circuit 320. For example, delay signal DELAY1 goes to a logic low state at time $t_3$ and goes to a logic high state at time $t_9$.

Delay signal DELAY1 propagates through delay circuit 330 which outputs a delay signal DELAY2. Hence, delay signal DELAY2 lags behind delay signal DELAY1 by a time delay produced by delay circuit 330. For example, delay signal DELAY2 goes to a logic low state at time $t_5$ and goes to a logic high state at time $t_{11}$.

Logic circuit 340 combines delay signals DELAY1 and DELAY2, producing a pulse signal PULSE, for example, between time $t_4$ and time $t_6$ and between time $t_{10}$ and time $t_{12}$. It is noted that delay signal DELAY1 produced by delay circuit 320 determines the rising edge of the pulse signal PULSE and delay signal DELAY2 produced by delay circuit 330 determines the falling edge (or the duration) of the pulse signal PULSE.

At time $t_{13}$, the clock signal CLK starts a third cycle $T_3$. The write enable signal ENABLE goes to a logic high state at time $t_{14}$ after a time delay caused by D flip-flop 410 (or D flip-flop 420) and selector 430. Logic circuit 350 performs an AND logic function on pulse signal PULSE and write enable signal ENABLE to produce a RAM write enable pulse RAM_WE. For example, when write enable signal ENABLE is high and the pulse signal PULSE is also high, RAM write enable pulse RAM_WE is at a logic high state after a time delay, at time $t_{15}$. Similarly, when write enable signal ENABLE is high and the pulse signal PULSE is low, RAM write enable pulse RAM_WE is at a logic low state after a time delay, at time $t_{16}$. It is noted that the RAM write enable pulse RAM_WE is derived from the rising edge of the input clock signal CLK only and no falling edge of the input clock signal CLK is used.

While the present invention has been described with reference to particular figures. It should be understood that the description is for illustration only and should not be taken as limiting the scope of the invention. Many changes and modifications may be made to the invention, by one having ordinary skill in the art, without departing from the scope of the invention.

I claim:

1. A crossbar switch circuit, comprising:
a plurality of ports coupled to a bus;
at least one memory element coupled to one of said plurality of ports; and
a circuit operable to generate a write enable pulse, the circuit coupled to said at least one memory element, comprising:
a pulse generator operable to generate a pulse, said pulse tracking a leading edge of a clock signal;
a write enable signal generator operable to generate a write enable signal;
a first logic circuit coupled to said pulse generator and said write enable signal generator operable to generate said write enable pulse by combining said pulse and said write enable signal; and
a data bus operable to couple each of said plurality of ports to a data input of said at least one memory element.

2. The crossbar switch circuit of claim 1, wherein said pulse generator comprises:
a device operable to generate an output signal in response to said clock signal;
a first delay circuit operable to generate a first delay signal in response to said output signal;
a second delay circuit coupled to said first delay circuit, said second delay circuit operable to generate a second delay signal in response to said first delay signal; and
a second logic circuit coupled to said first delay circuit and said second delay circuit, said second logic circuit operable to generate said pulse by combining said first delay signal and said second delay signal.

3. The crossbar switch circuit of claim 2, wherein said device comprises a toggle flip-flop.

4. The crossbar switch circuit of claim 2, wherein said first delay circuit includes at least one delay element.

5. The crossbar switch circuit of claim 4, wherein said first delay circuit includes a plurality of delay elements, said delay elements being selected from the group consisting of inverting delay elements and noninverting delay elements.

6. The crossbar switch circuit of claim 2, wherein said second delay circuit includes at least one delay element.

7. The crossbar switch circuit of claim 6, wherein said second delay circuit includes a plurality of delay elements, said delay elements being selected from the group consisting of inverting delay elements and noninverting elements.

8. The crossbar switch circuit of claim 1, wherein said write enable signal generator comprises a register operable to register an external write enable signal, said register being clocked by said clock signal.

9. The crossbar switch circuit of claim 1, wherein said write enable signal generator comprises a plurality of registers operable to register a plurality of external write enable signals, further comprising a selector operable to select a registered external write enable signal.

10. The crossbar switch circuit of claim 1, wherein said at least one memory element comprises a RAM (random access memory).

11. The crossbar switch circuit of claim 10, wherein said RAM comprises an asynchronous RAM.

12. The crossbar switch circuit of claim 1, wherein a first port of said plurality of ports comprises a plurality of memory elements, further comprising a first selector coupled to said plurality of memory elements, said first selector being coupled to said bus.

13. The crossbar switch circuit of claim 1, wherein a first port of said plurality of ports comprises a plurality of memory elements, further comprising:
- a first selector coupled to said plurality of memory elements;
- a second selector coupled to a second port of said plurality of ports; and
- a third selector coupled to said first selector and said second selector, said third selector being coupled to said bus.

14. A computer system, comprising:
a crossbar switch comprising:
- a plurality of ports coupled to a bus;
- at least one memory element coupled to one of said plurality of ports; and
- a circuit operable to generate a write enable pulse coupled to each of said at least one memory element, comprising:
  - a pulse generator operable to generate a pulse, said pulse tracking a leading edge of a clock signal;
  - a write enable signal generator operable to generate a write enable signal, said write enable signal generator including a register that is operable to register an external write enable signal, said register being clocked by said clock signal; and
  - a first logic circuit coupled to said pulse generator and said write enable signal generator operable to generate said write enable pulse by combining said pulse and said write enable signal; and
at least one processing unit coupled to each of said plurality of port.

15. The computer system of claim 14, wherein said at least one processing unit comprises a processing unit selected from the group consisting of CPUs (central processing units) and I/O (input/output) processors.

16. The computer system of claim 14, wherein a plurality of processing units are coupled to a first port, further comprising a selector operable to select one processing unit from said plurality of processing units.

17. The computer system of claim 14, wherein said processing unit is an I/O (input/output) processor, further comprising an I/O buffer coupled between said port and said I/O processor.

18. The computer system of claim 14, wherein said pulse generator comprises:
- a device operable to generate an output signal in response to said clock signal;
- a first delay circuit operable to generate a first delay signal in response to said output signal;
- a second delay circuit coupled to said first delay circuit, said second delay circuit generating a second delay signal in response to said first delay signal; and
- a second logic circuit coupled to said first delay circuit and said second delay circuit, said second logic circuit generating said pulse by combining said first delay signal and said second delay signal.

19. The computer system of claim 18, wherein said first delay circuit includes at least one delay element.

20. The computer system of claim 19, wherein said first delay circuit includes a plurality of delay elements, said delay elements being selected from the group consisting of inverting delay elements and noninverting delay elements.

21. The computer system of claim 18, wherein said second delay circuit includes at least one delay element.

22. The computer system of claim 21, wherein said second delay circuit includes a plurality of delay elements, said delay elements being selected from the group consisting of inverting delay elements and noninverting elements.

23. The computer system of claim 14, wherein said write enable signal generator comprises a plurality of registers operable to register a plurality of external write enable signals, further comprising a selector operable to select a registered external write enable signal.

24. A method for communicating between a first processing unit coupled to a first port of a crossbar switch and a second processing unit coupled to a second port of said crossbar switch, comprising:
- generating a request for a communication path from said first processor to said second processor;
- transmitting data from said second processor to said first port;
- storing said data in a memory element in said first port, comprising:
  - generating a pulse in response to a clock signal, said pulse tracking a leading edge of said clock signal;
  - generating a write enable signal, wherein generating the write enable signal includes registering at least one external write enable signal; and
  - generating a write enable pulse by combining said pulse and said write enable signal; and
- reading said data from said memory element.

25. The method of claim 24, wherein generating a pulse comprises:
- generating an output signal in response to said clock signal;
- delaying said output signal to generate a first delay signal;
- delaying said first delay signal to generate a second delay signal; and
- performing a first logic function on said first delay signal and said second delay signal, thereby generating said pulse.

26. The method of claim 25, further comprising arranging at least one delay elements in accordance with a predetermined setup time and a predetermined hold time, said at least one delay elements being selected from the group consisting of inverting delay elements and noninverting delay elements.

27. The method of claim 25, further comprising determining said first logic function in accordance with a first polarity of said first delay signal and a second polarity of said second delay signal.

28. The method of claim 24, wherein a plurality of external write enable signals are registered, further comprising:
- selecting a registered external write enable signal; and
- generating said write enable signal from a selected registered external write enable signal.

29. The method of claim 24, wherein combining said pulse and said write enable signal comprises:
- performing a second logic function; and
- determining said second logic function in accordance with whether said write enable pulse is active high or active low.

* * * * *